(12) United States Patent
Ye et al.

(10) Patent No.: US 12,018,860 B2
(45) Date of Patent: Jun. 25, 2024

(54) INTEGRATED PRESSURE CONDENSING BOILER

(71) Applicant: LANGFANG JINHUA BOILER CO., LTD., Langfang (CN)

(72) Inventors: Guoling Ye, Langfang (CN); Xijun Zhang, Langfang (CN); Hui Ye, Langfang (CN); Qing Ye, Langfang (CN); Bing Zhang, Langfang (CN); Xin Zhao, Langfang (CN); Guolei Wang, Langfang (CN); Weidong Yao, Langfang (CN); Jianzhong Wu, Langfang (CN); Yimin Wu, Langfang (CN); Liang Du, Langfang (CN)

(73) Assignee: Langfang Jinhua Boiler Co., Ltd., Langfang (CN)

( * ) Notice: Subject to any disclaimer, the term of this patent is extended or adjusted under 35 U.S.C. 154(b) by 203 days.

(21) Appl. No.: 17/858,837

(22) Filed: Jul. 6, 2022

(65) Prior Publication Data

US 2023/0027757 A1  Jan. 26, 2023

Related U.S. Application Data

(63) Continuation of application No. PCT/CN2021/112442, filed on Aug. 13, 2021.

(30) Foreign Application Priority Data

Jul. 16, 2021 (CN) .......................... 202110809174.2

(51) Int. Cl.
*F24H 8/00* (2022.01)
*F24H 1/46* (2022.01)
(Continued)

(52) U.S. Cl.
CPC .............. *F24H 8/006* (2013.01); *F24H 1/46* (2013.01); *F24H 9/0005* (2013.01); *F24H 9/16* (2013.01); *F24H 9/1832* (2022.01)

(58) Field of Classification Search
CPC .............. F24H 8/00; F24H 8/006; F24H 1/40
(Continued)

(56) References Cited

U.S. PATENT DOCUMENTS 2,536,425 A * 1/1951 Daly ......................... F24H 1/44
122/145
2,622,853 A * 12/1952 Becker ................... B01J 8/0285
122/18.4
(Continued)

FOREIGN PATENT DOCUMENTS

CN 2372614 Y 4/2000
CN 2532364 Y 1/2003
(Continued)

*Primary Examiner* — Steven B McAllister
*Assistant Examiner* — John E Bargero
(74) *Attorney, Agent, or Firm* — AP3 Law Firm PLLC (57) ABSTRACT

An integrated pressure condensing boiler is provided which relates to the technical field of boilers. The integrated pressure condensing boiler includes a pressure-bearing housing, a heat-exchange furnace arranged in the pressure-bearing housing, a combustion chamber communicating with the heat-exchange furnace and cooling tube groups fixed in the heat-exchange furnace. Heat-exchange medium flows from bottom to top in the pressure-bearing housing and in the cooling tube groups, and exchanges heat with high-temperature flue gas flowing from top to bottom in the heat-exchange furnace, thus achieving a counterflow heat exchanging. The heat-exchange furnace includes a multi-stage heat-exchange chamber with each heat-exchange chamber being cylindrical. The heat-exchange chambers are arranged in sequence from top to bottom to achieve a flue
(Continued)

gas diffusing manner that high-temperature flue gas diffuses from center part to periphery and then gathers from periphery to center part.

18 Claims, 5 Drawing Sheets

(51) Int. Cl.
  *F24H 9/00* (2022.01)
  *F24H 9/16* (2022.01)
  *F24H 9/1832* (2022.01)
(58) Field of Classification Search
  USPC .......................................................... 126/344
  See application file for complete search history.

(56) References Cited

U.S. PATENT DOCUMENTS

| | | | |
|---|---|---|---|
| 10,753,644 B2 * | 8/2020 | Niu | ........................... F24H 1/44 |
| 2014/0373794 A1 | 12/2014 | Choi | |
| 2020/0355396 A1 | 11/2020 | Park et al. | |

FOREIGN PATENT DOCUMENTS

| | | | | |
|---|---|---|---|---|
| CN | 102331085 A | | 1/2012 | |
| CN | 105004042 A | | 10/2015 | |
| CN | 207555992 U | | 6/2018 | |
| CN | 108826688 A | | 11/2018 | |
| CN | 208720515 | * | 4/2019 | ............... F24H 8/00 |
| CN | 208720515 U | | 4/2019 | |
| CN | 208735899 U | | 4/2019 | |
| CN | 111059759 A | | 4/2020 | |

* cited by examiner

INTEGRATED PRESSURE CONDENSING BOILER

CROSS-REFERENCE TO RELATED APPLICATIONS

This application is a continuation application of International Application No. PCT/CN2021/112442, filed on Aug. 13, 2021, which claims priority to Chinese Patent Application No. CN 202110809174.2, filed on Jul. 16, 2021. The disclosures of the aforementioned applications are hereby incorporated herein by reference in their entireties.

TECHNICAL FIELD

The present application belongs to the technical field of boilers, and particularly relates to an integrated pressure condensing boiler.

BACKGROUND

The exhaust gas temperature of the condensing boiler is greatly reduced, and it can absorb the latent heat released by the condensation of the steam in the flue gas, so as to achieve the purpose of improving the thermal efficiency of boiler. The maximum thermal efficiency of condensing boiler can reach 109%, which is 15-17% higher than that of ordinary gas-fired boiler.

Condensing boiler has high application value because of its efficient energy saving. However, most of the pressure condensing boilers in the prior art need to be equipped with additional condensing heat exchange equipment outside the main body of boiler, which results in a very complex overall structure of the pressure condensing boiler and high manufacturing, installation and application costs.

SUMMARY

These and other problems are generally solved or circumvented, and technical advantages are generally achieved, by embodiments of the present application which provide an integrated pressure condensing boiler.

TECHNICAL PROBLEMS

The integrated pressure condensing boiler provided by the present application, based on principles of countercurrent heat transfer, enhancing flue gas side heat transfer and improving convective heat transfer coefficient, is suitable for pressure operation and the thermal efficiency is increased to more than 100%, and no additional supporting condensing heat exchange equipment is required, which greatly reduces the manufacturing, installation and application costs of pressure condensing boilers.

TECHNICAL SOLUTIONS

In order to achieve the above purpose, the technical solution adopted in the present application is to provide an integrated pressure condensing boiler. The boiler includes a pressure-bearing housing, a heat-exchange furnace, a combustion chamber and cooling tube groups. The heat-exchange furnace and combustion chamber are arranged in the pressure-bearing housing, and the combustion chamber is communicated with the heat-exchange furnace. The cooling tube groups are fixed in the heat-exchange furnace.

The pressure-bearing housing is provided with a flue gas outlet pipe, a heat-exchange medium inlet and a heat-exchange medium outlet. The flue gas outlet pipe is communicated with the heat-exchange furnace. Heat-exchange medium flows from bottom to top in the pressure-bearing housing and in the cooling tube groups, and exchanges heat with high-temperature flue gas flowing from top to bottom in the heat-exchange furnace, thus achieving a counterflow heat exchanging.

The heat-exchange furnace includes a multi-stage heat-exchange chamber that includes heat-exchange chambers. Each (stage) of heat-exchange chamber is cylindrical. Two adjacent heat-exchange chambers are communicated with each other through a flue gas channel. The heat-exchange chambers are arranged one upon another from top to bottom to achieve a flue diffusing manner that the high-temperature flue gas diffuses from a center part of one heat-exchange chamber to a periphery of the heat-exchange chamber and then gathers from a periphery of next heat-exchange chamber to a center part of the next heat-exchange chamber. Each heat-exchange chamber is provided with a cooling tube group that are vertically arranged in the heat-exchange chamber. In each heat-exchange chamber, the high-temperature flue gas laterally scours the cooling tube group arranged in the heat-exchange chamber. For one cooling tube group arranged in a heat-exchange chamber, the heat-exchange medium is driven upward to enter the cooling tube group and exchange heat with the high-temperature flue gas in the heat-exchange chamber, then the heat-exchange medium discharges from an upper part of the cooling tube group and mixes with the heat-exchange medium that in the pressure-bearing housing and outside the heat-exchange chambers. It is noted that the heat-exchange medium may be driven by a drive unit, such as a pump. This is known to those skilled in the art.

The integrated pressure condensing boiler provided by this technical solution organically combines and fully utilizes the basic principles of countercurrent heat transfer of heat transmission science, of enhancing flue gas side heat transfer, and of improving convective heat transfer coefficient, thus effectively improving thermal efficiency and greatly reducing unit steel consumption. That is, the integrated pressure condensing boiler provided by this technical solution can achieve higher thermal efficiency with less steel consumption.

In this technical solution, high-temperature flue gas diffuses from top to bottom in the manner of diffusing firstly from center to periphery and then gathering from periphery to center, to form a countercurrent heat exchanging with heat-exchange medium flowing from bottom to top. At the lower part of the boiler, the temperature of heat-exchange medium is low that makes the temperature of exhaust gas low. At the upper part of the boiler, the temperature of the flue gas is high that makes the temperature of discharged heat-exchange medium high. The pressure-bearing housing and the heat-exchange furnace whose overall shape is circular, are suitable for pressure-bearing operation. In the present application, the heat-exchange medium is generally water. When discharged, the heat-exchange medium may be high temperature water, low temperature water or steam. Especially, each stage of heat-exchange chamber has a relatively independent heat-exchange cavity. High-temperature flue gas is forced to flow in the heat-exchange cavity to improve heat exchange efficiency. Each stage of heat-exchange chamber is cylindrical which is can realize pressure-bearing operation of boiler. Compared to the boilers in the prior art that need to be equipped with additional condensing heat exchange equipment outside the main body of boiler, the integrated pressure condensing boiler provided by the present application has, on the one hand, achieved the thermal efficiency that can meet the requirements of the level 1 energy efficiency of condensing boiler in the GB24500-2020 "Industrial Boiler Energy Efficiency Limited Value and Energy Efficiency Level", and, on the other hand, doesn't need to be equipped with additional condensing heat exchange equipment and has high thermal efficiency, simple structure and low manufacturing, installation and use costs. The term "integrated" refers that the boiler provided by the present application can be used directly as a whole product. The integrated pressure condensing boilers provided by the present application has more promotion and application value.

In one possible implementation, each heat-exchange chamber includes a cylindrical peripheral wall, an upper tube plate and a lower tube plate. The upper tube plate and the lower tube plate are hermetically connected with the peripheral wall, thus enclosing an inner cavity (i.e., the heat-exchange cavity mentioned above) of one heat-exchange chamber. The upper tube plate is provided with a flue gas inlet, and the lower tube plate is provided with a flue gas outlet. The flue gas outlet of a final stage (i.e., bottom-most) heat-exchange chamber is arranged at the peripheral wall of the final stage heat-exchange chamber. The flue gas outlet of the final stage heat-exchange chamber is communicated with the flue gas outlet pipe.

In some embodiments, when the flue gas inlet or the flue gas outlet is used for passage of center high-temperature flue gas, the flue gas inlet or the flue gas outlet is arranged in a center part of the upper tube plate or the lower tube plate, and the flue gas inlet or the flue gas outlet is circular. When the flue gas inlet or the flue gas outlet is used for passage of peripheral high-temperature flue gas, the flue gas inlet or the flue gas outlet is arranged at a periphery of the upper tube plate or the lower tube plate, and the flue gas inlet or the flue gas outlet is arc shaped. Or, the flue gas inlet or the flue gas outlet includes a plurality of circular holes that are arranged in an arc shape.

Exemplarily, the flue gas inlet or the flue gas outlet arranged at the periphery of the upper tube plate or the lower tube plate is coaxial with the heat-exchange chamber that the upper tube plate or the lower tube plate belongs to.

Exemplarily, the flue gas inlet or the flue gas outlet arranged in the center part of the upper tube plate or the lower tube plate, is arranged approximately coaxially with the heat-exchange chamber that the upper tube plate or the lower tube plate belongs to.

In some embodiments, along the direction of downward, a shape, position and size of the flue gas outlet of an upper-stage heat-exchange chamber, corresponds to a shape, position and size of the flue gas inlet of a lower-stage heat-exchange chamber, respectively. The flue gas turning channel that are used for communicating two adjacent heat-exchange chambers, is arranged vertically between the two adjacent heat-exchange chambers.

In some embodiments, all cooling tubes of the cooling tube group in each heat-exchange chamber are connected vertically between the upper tube plate and the lower tube plate of each heat-exchange chamber, and the cooling tubes are communicated with a space that is inside of the pressure-bearing housing and outside of all the heat-exchange chambers.

Exemplarily, the cooling tube group in each heat-exchange chamber includes 2 to 4 cooling tube circles. Each cooling tube circle includes multiple cooling tubes that are arranged circularly. Each cooling tube circle is arranged around the flue gas inlet or the flue gas outlet that is arranged at the center part of one heat-exchange chamber. The present application doesn't limit the number of the cooling tube circles, and it may be 5 or more.

In one possible implementation, along a direction of downward, heights of the heat-exchange chambers decreases sequentially.

In one possible implementation, surrounding the heat-exchange furnace, more than one partition plate is arranged between the pressure-bearing housing and the heat-exchange furnace. On the one hand, the partition plates can prevent heat-exchange medium from flowing through the cooling tube groups in a small amount or never flowing through the cooling tube groups, due to resistance; and on the other hand, they can prevent the heated heat-exchange medium from flowing back to the lower low-temperature heat-exchange medium area, resulting the temperature of the heat-exchange medium in the bottom increases, which may further lead to an increase in the exhaust gas temperature of the flue gas outlet pipe.

In some embodiments, each heat-exchange chamber is correspondingly provided with a partition plate. This not only ensures that all or most of heat-exchange medium flows through the cooling tube groups, but also prevents the higher temperature heat-exchange medium from flowing back to the lower temperature heat-exchange medium area.

In some embodiments, a partition plate completely or incompletely closes the gap between the pressure-bearing housing and the heat-exchange furnace.

In one possible implementation, a first heat-exchange chamber (i.e., a first stage heat-exchange chamber) of the multi-stage heat-exchange chamber communicates with the combustion chamber, and a second heat-exchange chamber (i.e., a second stage heat-exchange chamber) communicates with the first heat-exchange chamber. A first flue gas inlet is arranged in the center part of the upper tube plate of the first heat-exchange chamber, a first flue gas outlet is arranged at the lower tube plate of the first heat-exchange, and the first flue gas outlet is arranged close to the peripheral wall of the first heat-exchange chamber. The upper tube plate of the second heat-exchange chamber is provided with a second flue gas inlet corresponding to the first flue gas outlet, and the center part of the lower tube plate of the second heat-exchange chamber is provided with a second flue gas outlet. The second flue gas outlet is used to communicate with a third heat-exchange chamber (i.e., a third stage heat-exchange chamber) or communicate with the flue gas outlet pipe provided on the pressure-bearing housing. High-temperature flue gas enters the first heat-exchange chamber from the center part of the first heat-exchange chamber and diffuses to the periphery of the first heat-exchange chamber, then the high-temperature flue gas enters the second heat-exchange chamber from the periphery of the second heat-exchange chamber and gathers to the second flue gas outlet arranged at the center part of the lower tube plate of the second heat-exchange chamber, thus laterally scouring the cooling tube group in the second heat-exchange chamber.

In this implementation, high-temperature flue gas enters the first heat-exchange chamber from the first flue gas inlet arranged in the center part of the upper tube plate of the first heat-exchange chamber, then diffuses to the periphery of the first heat-exchange chamber. Then, high-temperature flue gas enters the second heat-exchange chamber through the second flue gas inlet and gathers to the second flue gas outlet arranged in the center part. In this way, high-temperature flue gas can laterally scour the cooling tube group, so as to improve convective heat transfer coefficient. The same principle applies to the third heat-exchange chamber and/or other heat-exchange chambers.

In some embodiments, the first flue gas inlet is circular, and the first flue gas outlet and the second flue gas inlet are arc shaped.

In some embodiments, the first flue gas inlet is circular, and both the first flue gas outlet and the second flue gas inlet include a plurality of circular holes that are arranged in an arc shape.

In some embodiments, a height of the second heat-exchange chamber is less than a height of the first heat-exchange chamber.

In some embodiments, the multi-stage heat-exchange chamber may be a 4-stage heat-exchange chamber including four heat-exchange chambers. The second heat-exchange chamber is connected with the third heat-exchange chamber (i.e., the third stage heat-exchange chamber) of the four heat-exchange chambers, and the third heat-exchange chamber is connected with a fourth heat-exchange chamber (i.e., a fourth stage heat-exchange chamber) of the four heat-exchange chambers. The center part of the upper tube plate of the third heat-exchange chamber is provided with a third flue gas inlet that matches the second flue gas outlet, the lower tube plate of the third heat-exchange chamber is provided with a third flue gas outlet, and the third flue gas outlet is arranged closed to the peripheral wall of the third heat-exchange chamber. The upper tube plate of the fourth heat-exchange chamber is provided with a fourth flue gas inlet corresponding to the third flue gas outlet, the peripheral wall of the fourth heat-exchange chamber is provided with a fourth flue gas outlet communicating with the flue gas outlet pipe. It is noted that the number of the heat-exchange chambers is not limited in the present application, and the heat-exchange furnace may further include a fifth or more heat-exchange chambers in the design principle that high-temperature flue gas can diffuse from center to periphery then gather from periphery to center.

In some embodiments, the first flue gas inlet, the second flue gas outlet and the third flue gas inlet are circular. Each of the first flue gas outlet, the second flue gas inlet, the third flue gas outlet and the fourth flue gas inlet is arc shaped. Or, each of them includes a plurality of circular holes that are arranged in arc shape.

In some embodiments, the flue gas outlet pipe is arranged away from the fourth flue gas inlet.

In some embodiments, heights of the first heat-exchange chamber, the second heat-exchange chamber, the third heat-exchange chamber and the fourth heat-exchange chamber decrease sequentially.

Compared to the prior art, the integrated pressure-bearing condensing boiler provided by the present application can operate in pressure bearing environment and improves heat exchange efficiency through the cooperation of the pressure-bearing housing, the heat-exchange furnace, the combustion chamber and the cooling tube groups. In addition, the integrated pressure-bearing condensing boiler provided by the present application has a simple structure and doesn't need to be equipped with additional condensing heat exchange equipment, and its manufacturing, installation and application costs are low.

10, pressure-bearing housing; 11, heat-exchange medium inlet; 12, heat-exchange medium outlet; 13, partition plate; 20, heat-exchange furnace; 201, first flue gas turning channel; 202, second flue gas turning channel; 203, third flue gas turning channel; 204, condensate water drain pipe; 21, first heat-exchange chamber; 211, first cooling tube group; 212, first flue gas inlet; 213, first flue gas outlet; 22, second heat-exchange chamber; 221, second cooling tube group; 222, second flue gas outlet; 23, third heat-exchange chamber; 231, third cooling tube group; 232, third flue gas outlet; 24, fourth heat-exchange chamber; 241, fourth cooling tube group; 242, fourth flue gas outlet; 243, circular hole; 30, combustion chamber; 31, burner connector; 32, flue gas outlet pipe; 41, peripheral wall; 42, upper tube group; 43, lower tube group.

DETAILED DESCRIPTION OF ILLUSTRATIVE EMBODIMENTS

In order to make the technical problems to be solved by the present application, technical solutions and advantageous effects clearer, the present application will be further described in detail below with reference to the accompanying drawings and embodiments. It should be understood that the specific embodiments described herein are only used to explain the present application, but not to limit the present application.

Both pressure condensing boiler and atmospheric pressure condensing boiler are a type of boiler products. For atmospheric boiler, its gauge pressure of the rated operating pressure is zero, and its temperature of heat-exchange medium at the outlet does not exceed 90° C. For pressure boiler, its operating pressure is ≥0.1 MPa, its temperature of heat-exchange medium at the outlet may be higher than 100° C., and it can adjust the water temperature. Pressure boiler can provide not only high and low temperature hot water, but also high temperature steam. Meanwhile, pressure boiler can also be directly used in the pressure bearing operating environment. Therefore, pressure boiler has a wider range of applications.

Applicant had developed an atmospheric condensing boiler, which divides a square heat-exchange furnace into continuous flue gas channels with at least one stage of turning structure through flue gas baffles. However, this structure cannot be applied to pressure boiler. Therefore, the present application provides an integrated pressure-bearing condensing boiler, and the integrated pressure-bearing condensing boiler can be applied to a wider range of applications.

The present application will be described in further detail below with reference to the accompanying drawings and embodiments.

Figure 1:
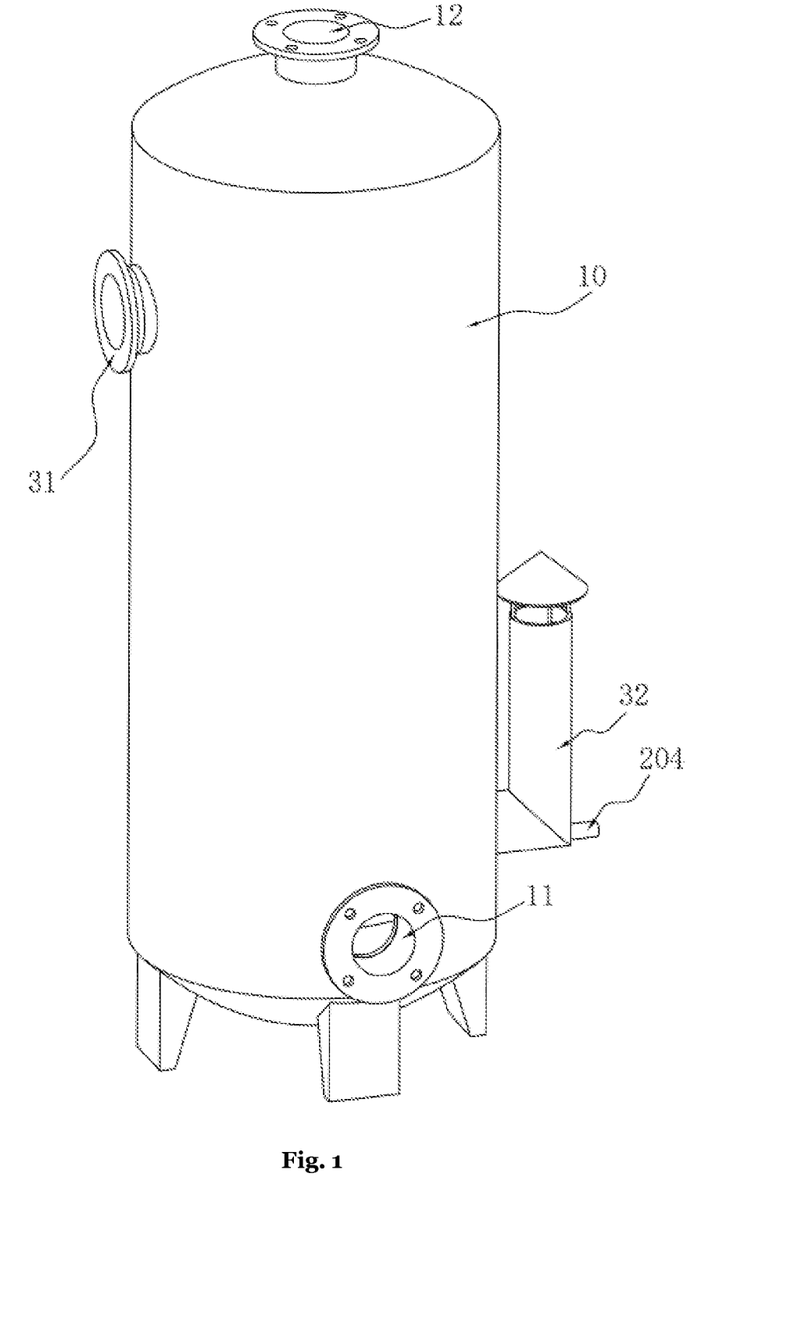
FIG. 1 is a perspective view of the integrated pressure condensing boiler according to embodiments of the present application.
Figure 2:
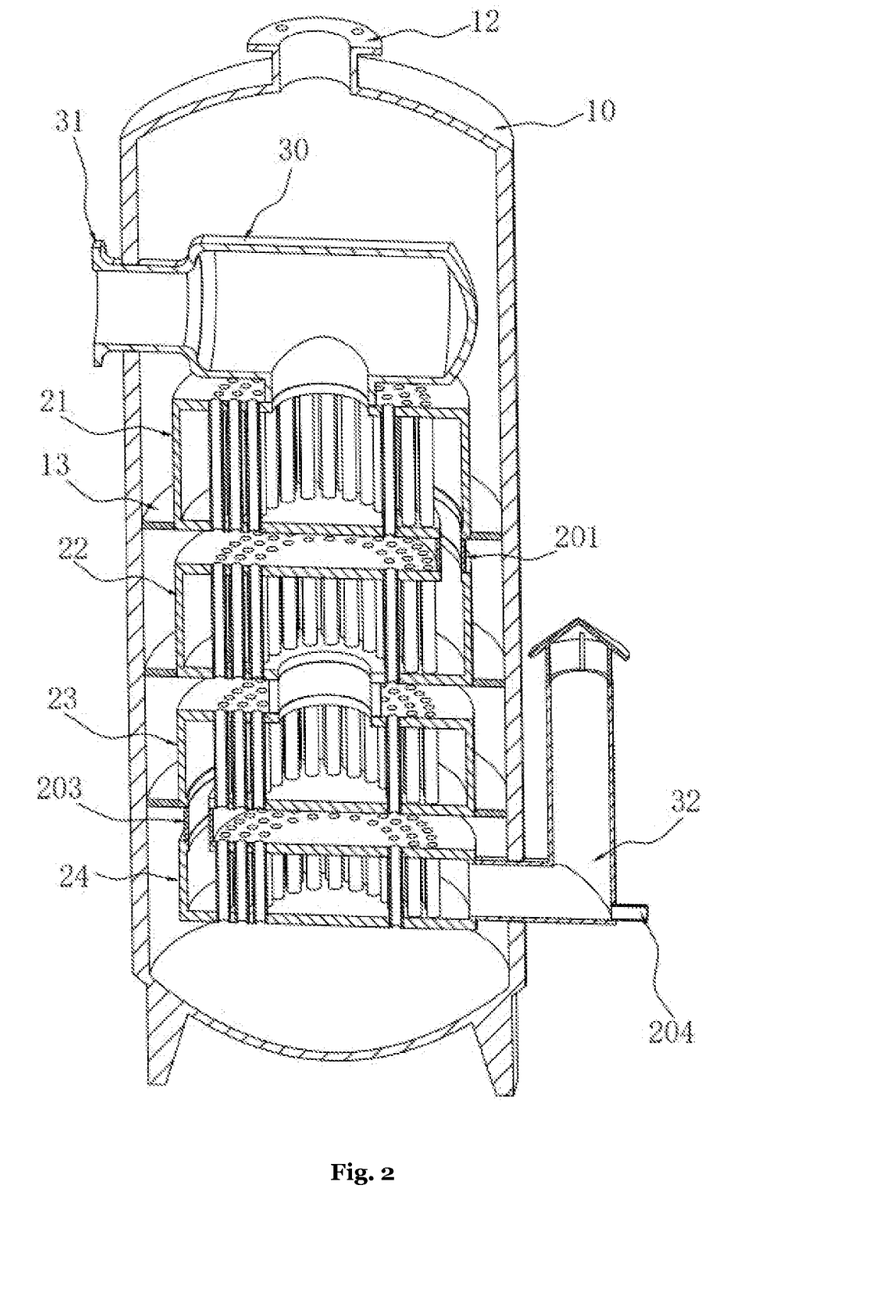
FIG. 2 is a sectional view of FIG. 1.

Referring to FIG. 1 and FIG. 2, the pressure-bearing condensing boiler according to one embodiment of the present application includes a pressure-bearing housing 10, a heat-exchange furnace 20 disposed in the pressure-bearing housing 10, a combustion chamber 30 communicating with the heat-exchange furnace 20, and cooling tube groups fixed in the heat-exchange furnace 20. The pressure-bearing housing 10 includes a cylindrical body and two ellipsoidal heads that are connected at the upper end and the lower end of the cylindrical body respectively, as shown in FIG. 1. The upper part of the pressure-bearing housing 10 is provided with a burner connector 31 connected with the combustion chamber 30, and the lower part of the pressure-bearing housing 10 is provided with a flue gas outlet pipe 32 which communicates with the heat-exchange furnace 20. It should be noted that the term "burner connector" should be understood in a broad sense, i.e., the burner connector 31 is a connection structure used for the combustion chamber 30 connecting external parts; any connection structure between the combustion chamber 30 and the external parts that can be obtained by those skilled in the art without creative work shall be deemed to have been disclosed in the present application.

The closed end of the combustion chamber 30 is a smooth end, and the other end of the combustion chamber 30 is an open end. The open end communicates with the burner connector 31 in a smooth transition manner. The premixed combustible gas is fully combusted in the combustion chamber 30 (thus, generating high-temperature flue gas), and the high-temperature flue gas diffuses from top to bottom through the heat-exchange furnace 20, and finally arrives at the flue gas outlet pipe 32. Meanwhile, a heat-exchange medium inlet 11 communicating with heat-exchange medium is also provided at the lower part of the pressure-bearing housing 10, and a heat-exchange medium outlet 12 is arranged at the upper part of the pressure-bearing housing 10. Heat-exchange medium with lower temperature enters through the heat-exchange medium inlet 11, and then flows in the pressure-bearing hosing 10 and the cooling tube groups from bottom to top. During flowing from bottom to up, heat-exchange medium exchanges heat with the high-temperature flue gas in the heat-exchange furnace 20 in counter flow. The heat-exchange chambers are arranged one upon another from top to bottom to achieve a flue gas diffusing manner that the high-temperature flue gas diffuses from center part to periphery and then gathers from periphery to center part.

In this embodiment, the heat-exchange furnace 20 includes a multi-stage heat-exchange chamber including multiply heat-exchange chambers. Each heat-exchange chamber is cylindrical, and two adjacent heat-exchange chambers are communicated with each other through a flue gas turning channel. At the final stage of the flue gas diffusion, the final stage heat-exchange chamber is communicated with the flue gas outlet pipe 32. Cylindrical heat-exchange chamber is suitable for bearing pressure, and a heat-exchange space suitable for the flowing of heat-exchange medium is formed between the heat-exchange chambers and the pressure-bearing housing 10. Each heat-exchange chamber has a relatively independent heat-exchange cavity, and two adjacent heat-exchange cavities is communicated with each other through the flue gas channel thus forming a continuous flue gas channel. This increases the return paths of the flue gas, which is conducive to sufficient heat exchange, increase the outlet temperature of the heat-exchange medium, and reduce the outlet temperature of the flue gas, thus improving the thermal efficiency.

In this embodiment, there is a multi-stage heat-exchange chamber, such as a 2-stage heat-exchange chamber, a 3-stage heat-exchange chamber or a 4-stage heat-exchange chamber. In the following, an example of 2-stage heat-exchange chambers will be described. The flue gas inlet of the first-stage heat-exchange chamber is arranged at the center part of the upper tube plate 42 of the first-stage heat-exchange chamber. The flue gas outlet of the first-stage heat-exchange chamber is arranged at the lower tube plate 43 of the first-stage heat-exchange chamber, and the flue gas outlet of the first-stage heat-exchange chamber is arranged along the peripheral wall 41 of the first-stage heat-exchange chamber. Therefore, at the first-stage heat-exchange chamber, high-temperature flue gas enters from center part and diffuses to periphery. The flue gas inlet of the second-stage heat-exchange chamber is arranged at the upper tube plate of the second-stage heat-exchange chamber, and the flue gas inlet of the second-stage heat-exchange chamber is adapted to the shape and position of the flue gas outlet of the first-stage heat-exchange chamber. The flue gas outlet of the second-stage heat-exchange chamber is arranged at the center part of the lower tube plate of the second-stage heat-exchange chamber, and the flue gas outlet of the second-stage heat-exchange chamber communicates with the flue gas outlet pipe 32. Therefore, at the second-stage heat-exchange chamber, high-temperature flue gas enters from periphery, and then gathers to center part.

In summary, the heat-exchange chambers are arranged in the form of high-temperature flue gas diffusing from center part to periphery, and then gathering from periphery to center part. The flue gas fully scours the cooling tube group in each heat-exchange chamber, so as to effectively improve convective heat transfer coefficient. From top to bottom, the temperature of the flue gas in each heat-exchange chamber decreases stage by stage, and the temperature of the flue gas in the final stage heat-exchange chamber is lower than the temperature of the flue gas in any heat-exchange chamber above the final stage heat-exchange chamber.

Figure 3:
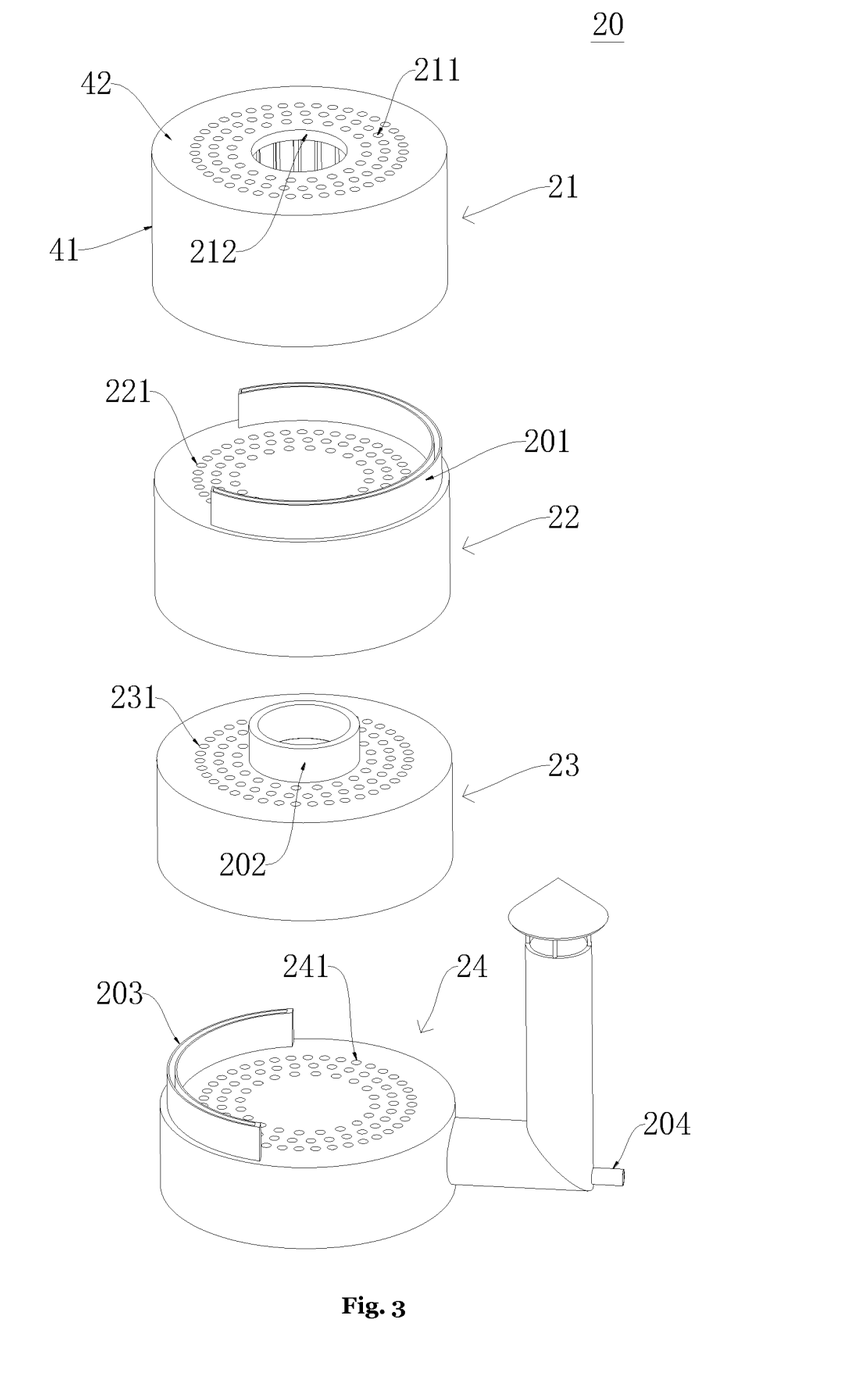
FIG. 3 is a first exploded view of the heat-exchange furnace according to embodiments of the present application.
Figure 4:
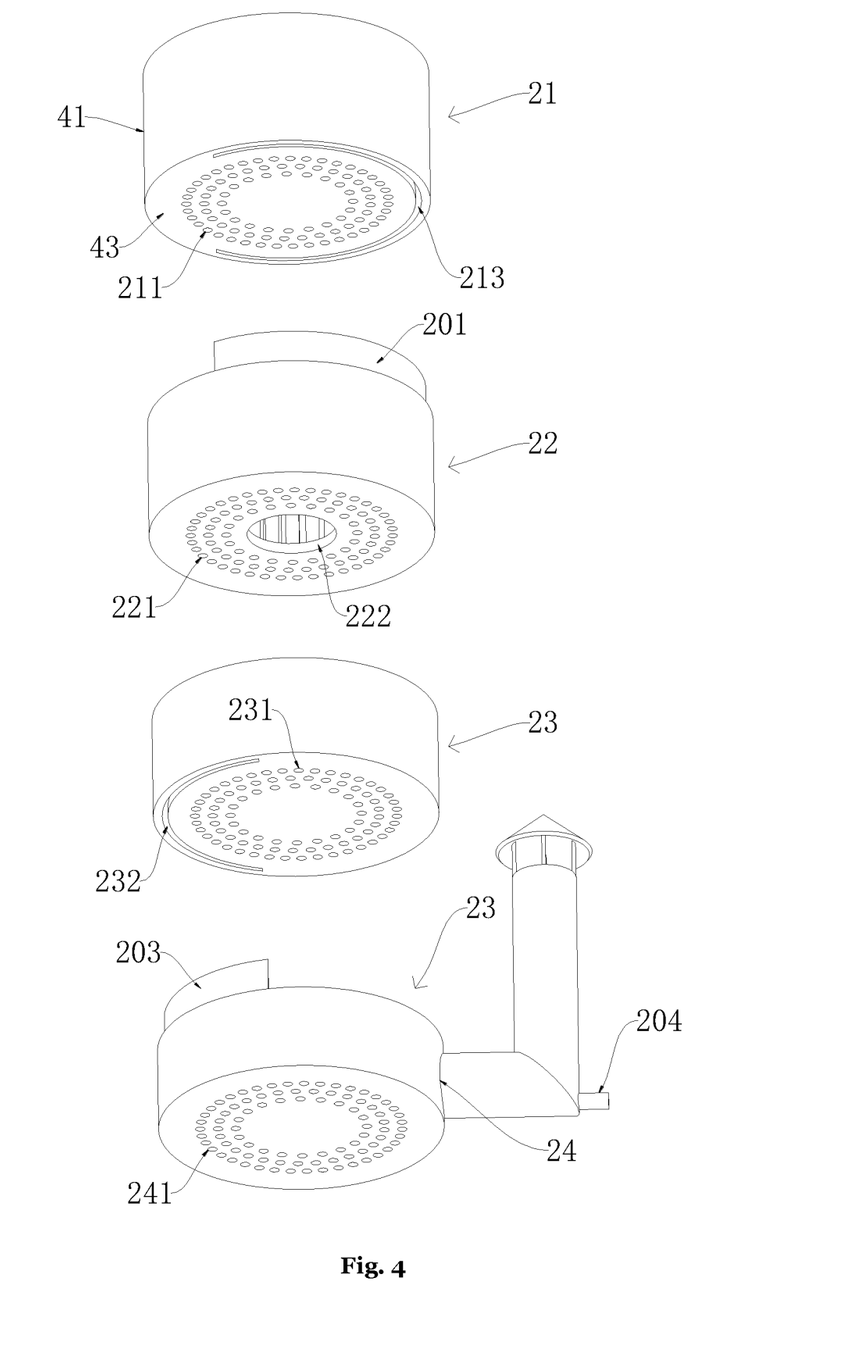
FIG. 4 is a second exploded view of the heat-exchange furnace according to embodiments of the present application.
Figure 5:
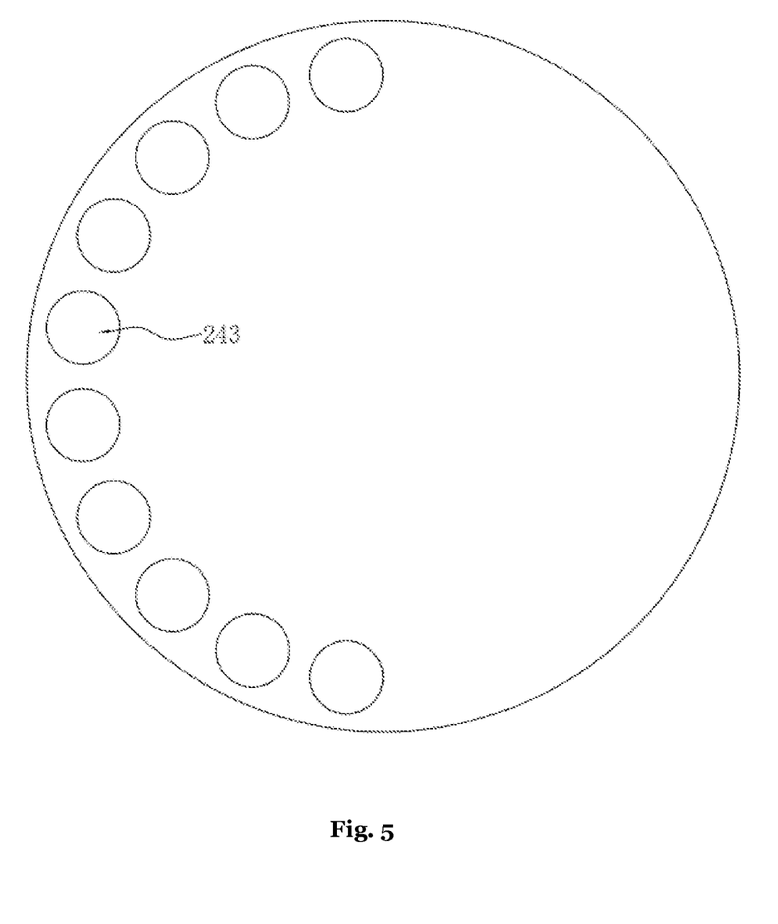
FIG. 5 is a schematic diagram of a flue gas inlet or a flue gas outlet according to embodiments of the present application, and the flue gas inlet or the flue gas outlet is arranged close to a peripheral wall of a heat-exchange chamber and includes a plurality of circular holes that are arranged in arc shape.

For each heat-exchange chambers, the flue gas inlet or outlet is in a smooth transition structure on the corresponding heat-exchange chamber, and the peripheral wall of the flue gas turning channel connected with the corresponding flue gas inlet and outlet is also in a smooth transition structure. As shown in FIG. 3 and FIG. 4, each stage of the heat-exchange chamber includes a cylindrical peripheral wall 41, an upper tube plate 42 and a lower tube plate 43 (For the clarity of the drawings, in FIG. 3 and FIG. 4, only the peripheral wall 41, the upper tube plate 42 and the lower tube plate 43 of the first heat-exchange chamber 21 are marked. The peripheral wall 41, the upper tube plate 42 and the lower tube plate 43 of the remaining heat-exchange chambers can be deduced by those skilled in the art by analogy). Both the upper tube plate 42 and the lower tube plate 43 are hermetically connected to the peripheral wall 41. A cooling tube group is arranged between the upper tube plate 42 and the lower tube plate 43. The upper tube plate 42 is provided with a flue gas inlet, and the lower tube plate 43 is provided with a flue gas outlet. The upper tube plate 42 and the lower tube plate 43 respectively fixed the two ends of the cooling tubes by welding or other manners. The cooling tubes of each cooling tube group are vertically arranged in the heat-exchange chamber. The cooling tubes are communicated with the inner space of the pressure-bearing shell 10 but are not communicated with the inner space of the heat-exchange furnace 20. Heat-exchange medium (usually water) enters cooling tubes from the lower ends of the cooling tubes, to exchange heat with the high-temperature flue gas in the heat-exchange chamber. Then the heat-exchange medium discharges from the upper ends of cooling tubes and mixes with the heat-exchange medium that is in the pressure housing 10 but outside the heat-exchange chambers. The flue gas inlet and outlet adopt a smooth transition structure, such as circular (e.g., the first flue gas inlet 212 shown in FIG. 3) or arc (e.g., the first flue gas outlet 213 shown in FIG. 4). The smooth transition structure is suitable for bearing pressure. The shape of the cross section of each flue gas turning channels is adapted to the shape of the corresponding flue gas inlet or outlet, and is suitable for bearing pressure.

In order to improve the heat exchange efficiency of the integrated pressure-bearing condensing boiler provided by the present application, more than one partition plate 13 are provided in the pressure-bearing housing 10. The partition plates 13 are arranged around the heat-exchange furnace 20 and between the pressure-bearing housing 10 and the heat-exchange furnace 20, as shown in FIG. 2. A partition plate 13 may be arranged above the final stage heat-exchange chamber, the purpose of which is to prevent the backflow of heat-exchange medium at higher temperature. If the higher temperature heat-exchange medium flows back, the temperature of the heat-exchange medium in the lower part of the pressure-bearing housing 10 will increase, and the heat exchange efficiency of the final stage heat-exchange chamber will decrease, which will lead to an increase in the outlet flue gas temperature.

In some embodiments, each heat-exchange chamber is correspondingly provided with a partition plate 13. Heat-exchange medium entering from the heat-exchange medium inlet 11 flows into the space between the heat-exchange furnace 20 and the pressure-bearing housing 10 after flowing through a cooling tube group. The partition plates 13 can prevent the upper heat-exchange medium from flowing back to the lower temperature heat-exchange medium area, thus effectively improving the heat exchange efficiency. A partition plate 13 may completely close the gap between the pressure-bearing housing 10 and the heat-exchange furnace 20, or may not completely close the gap between the pressure-bearing housing 10 and the heat-exchange furnace 20. When the partition plates 13 completely close the gap, the space is divided into upper and lower adjacent and disconnected spaces by the partition plates 13. In this case, heat-exchange medium cannot flow in the space between the heat-exchange furnace 20 and the pressure-bearing housing 10, and can only flow in the cooling tube groups. When the partition plates 13 does not completely close the gap, the gap is divided into upper and lower adjacent and interconnected spaces by the partition plates 13. In this case, heat-exchange medium can flow in the gap and the cooling tube groups at the same time. Multiple partition plates 13 may be provided, but it is not allowed to form a closed space between adjacent partition plates 13 to which the heat-exchange medium cannot flow.

The heights of the heat-exchange chambers at all stages can be the same or different. In some embodiments, in order to adjust the flue gas flow rate of each heat-exchange chamber to make the flue gas flow rate uniform, the heights of the heat-exchange chambers at all stages decrease sequentially along the direction of flue gas diffusion. Generally, when the flue gas flows from top to bottom, the flue gas temperature in the upper heat-exchange chamber is high, and the height of the heat-exchange chamber is large; the flue gas temperature in the final heat-exchange chamber is low, and the height of the final heat-exchange chamber is small.

As an embodiment, please refer to FIG. 2 to FIG. 5, the first heat-exchange chamber 21 communicates with the combustion chamber 30, and the second heat-exchange chamber 22 communicates with the first heat-exchange chamber 21. The first heat-exchange chamber 21 is provided with a first flue gas inlet 212 at the center part of the upper tube plate 42, the lower tube plate 43 of the first heat-exchange chamber 21 is provided with a first flue gas outlet 213 close to the peripheral wall 41. The upper tube plate of the second heat-exchange chamber 22 is provided with a second flue gas inlet corresponding to the first flue gas outlet 213, the center part of the lower tube plate of the second heat-exchange chamber 22 is provided with a second flue gas outlet 222. The second flue gas inlet is not marked in the figures. The shape, position and size of the second flue gas inlet are the same as the cross section of the first flue gas turning channel 201 marked in FIG. 3. As the same, the shapes, positions and sizes of the third flue gas inlet and the fourth flue gas inlet are the same as the cross section of the corresponding flue gas turning channel. The second flue gas outlet 222 is used for communication with the third heat-exchange chamber 23, or with the flue gas outlet pipe 32 provided on the pressure-bearing housing 10. In this embodiment, high-temperature flue gas enters from the center part of the first heat-exchange chamber 21 and then spreads to the periphery, then high-temperature flue gas enters the second heat-exchange chamber 22 from periphery and then gathers to center part, thus forming a lateral scouring to the corresponding cooling tube group.

High-temperature flue gas discharged from the combustion chamber 30 enters the first heat-exchange chamber 21 from the center part of the upper tube plate 42, and then diffuses around in the first heat-exchange chamber 21 and scours the first cooling tube group 211 laterally. Then the high-temperature flue gas enters the second heat-exchange chamber 22 from the first flue gas outlet 213 arranged at the lower tube plate 43 of the first heat-exchange chamber 21. The high-temperature flue gas gathers from periphery to center part in the second heat-exchange chamber 22 and scours the second cooling tube group 221 laterally. This flue gas flowing manner can increase the diffusion path of the flue gas, thus improving the heat exchange efficiency.

The flue gas inlet or outlet arranged in the center part of each heat-exchange chamber is circular, and the flue gas inlet or outlet arranged close to the peripheral wall 41 of each heat-exchange chamber is arc-shaped. Or, the flue gas inlet or outlet arranged close to the peripheral wall 41 of each heat-exchange chamber includes a plurality of circular holes arranged in an arc shape close to the peripheral wall 41. For example, the fourth flue gas inlet shown in FIG. 5 includes a plurality of circular holes 243, and the plurality of circular holes 243 are arrange in an arc shape close to peripheral wall 41 of the fourth heat-exchange chamber. The cooling tubes are not shown in FIG. 5.

The cooling tube group in each heat-exchange chamber is arranged in a circle around the corresponding flue gas inlet or outlet. Each cooling tube group includes 2 to 4 cooling tube circles and each cooling tube circle includes a plurality of cooling tubes arranged in a circle. It should be noted that the present application does not limit the number and the arrangement of the cooling tube circles; besides, the cooling tube group is arranged around the corresponding flue gas inlet or outlet means, taking the first heat-exchange chamber 21 and the second heat-exchange chamber 22 as examples, the cooling tube group in the first heat-exchange chamber 21 is arranged around the first flue gas inlet 212, the cooling tube group in the second heat-exchange chamber 22 surrounds the second flue outlet 222, i.e., if a flue gas outlet or inlet is arranged at the center part of the upper tube plate 42 or the lower tube plate 43 of the heat-exchange chamber, the cooling tube group will be arranged around this flue gas outlet or inlet.

According to the requirements of heat-exchange efficiency and exhaust gas temperature, in some embodiments, as shown in FIG. 2 to FIG. 5, the heat-exchange furnace 20 further includes a fourth heat-exchange chamber 24 that communicates with the third heat-exchange chamber 23. The center part of the upper tube plate 42 of the third heat-exchange chamber 23 is provided with a third flue gas inlet that matches the second flue gas outlet 222. The lower tube plate 43 of the third heat-exchange chamber 23 is provided with a third flue gas outlet 232 close to the peripheral wall 41. The upper tube plate 42 of the fourth heat-exchange chamber 24 is provided with a fourth flue gas inlet corresponding to the third flue gas outlet 232. The peripheral wall 41 of the fourth heat-exchange chamber 24 is provided with a fourth flue gas outlet 242 communicating with the flue gas outlet pipe 32. Of course, in order to improve the heat exchange efficiency, the heat-exchange furnace 20 may further include a fifth heat-exchange chamber, a sixth heat-exchange chamber, and so on.

The following takes the 4-stage heat-exchange chambers as an example to illustrate the setting of the heat-exchange chambers.

As shown in FIG. 3, the first flue gas inlet 212 is circular, and both ends of the first cooling tube group 211 penetrate through the upper tube plate 42 and the lower tube plate 43 of the first heat-exchange chamber 21 respectively. The first cooling tube group 211 is arranged in a circle around the first flue gas inlet 212 and includes three cooling tube circles, and the cooling tubes of adjacent cooling tube circles are arranged in the manner of circumferential staggering. The first flue gas outlet 213 is arc-shaped as a whole, and is matched with the peripheral wall 41 of the first heat-exchange chamber 21. The first flue gas outlet 213 is a smooth transition structure. High-temperature flue gas enters the first heat-exchange chamber 21 from the first flue gas inlet 212, and scours the first cooling tube group 211 arranged around the first flue gas inlet 212 in a manner of diffusing to the surrounding, so as to conduct sufficient heat exchange.

It should be noted that the first cooling pipe group 211 also may include two or four tube circles.

The shape of the second flue gas inlet matches the shape of the first flue gas outlet 213, the cross-sectional shape of the first flue gas channel 201 matches the shape of the first flue gas outlet 213, and each connecting surface transitions smoothly. The second flue gas outlet 222 is circular and is disposed in the center part of the lower tube plate 43 of the second heat-exchange chamber 22. The second flue gas channel 202 communicates with the second flue gas outlet 222 and the third flue gas inlet. The arrangement of the second cooling tube group 221 in the second heat-exchange chamber 22 is the same as the arrangement of the first cooling tube group 211 in the first heat-exchange chamber 21.

The shape of the third flue gas inlet matches the shape of the second flue gas outlet 222. The third flue gas channel 203 communicates with the third flue gas outlet 232 and the fourth flue gas inlet. The arrangement of the third cooling tube group 231 in the third heat-exchange chamber 23 is the same as the arrangement of the first cooling tube group 211 in the first heat-exchange chamber 21.

The shape of the fourth flue gas inlet matches the shape of the third flue gas outlet 232. The arrangement of the fourth cooling tube group 241 in the fourth heat-exchange chamber 24 is the same as the arrangement of the first cooling tube group 211 in the first heat-exchange chamber 21. A fourth flue gas outlet 242 is opened on the peripheral wall 41 of the fourth heat-exchange chamber 24, and the fourth flue gas outlet 242 communicates with the flue gas outlet pipe 32. The fourth flue gas outlet 242 and the flue gas outlet pipe 32 are both disposed away from the fourth flue gas inlet.

As shown in FIG. 1 and FIG. 2, the bottom of the flue gas outlet pipe 32 is connected with a condensate water drain pipe 204. The condensate water drain pipe 204 is used to discharge condensed water.

In order to enhance heat exchange on the flue gas side, heat-exchange fins (not shown in the drawings) can be arranged on the outer walls of the cooling tubes. The heat-exchange fins may be helically distributed along the axial direction of each cooling tube.

The integrated pressure condensing boiler provided by the present application organically combines and fully utilizes the basic principles of countercurrent heat transfer of heat transmission science, of enhancing flue gas side heat transfer, and of improving convective heat transfer coefficient, thus effectively improving thermal efficiency and greatly reducing unit steel consumption. That is, the integrated pressure condensing boiler provided by this technical solution can achieve higher thermal efficiency with less steel consumption.

In the matter of thermal efficiency, the integrated pressure condensing boiler provided in the present application is tested according to GB/T10180-2017 "Test procedure for thermal performance of industrial boilers". When the integrated pressure condensing boiler is running at full load and the return water temperature is 60° C., the flue gas outlet temperature is 61° C. and the thermal efficiency (calculated according to low calorific value) is 100%. When the integrated pressure condensing boiler is running at full load and the return water temperature is 30° C., the flue gas outlet temperature is 41° C. and the thermal efficiency (calculated according to low calorific value) is 105%. When the integrated pressure condensing boiler is running at 30% load and the return water temperature is 30° C., the flue gas outlet temperature is 35° C. and the thermal efficiency (calculated according to low calorific value) is 108%. When the integrated pressure condensing boiler is running at full load, the flue gas outlet temperature is 52° C. and the thermal efficiency (calculated according to low calorific value) is 103%.

In the matter of steel consumption, taking a 2.8 MW hot water boiler as an example, for a conventional horizontal internal-combustion three-return 2.8 MW hot water boiler, under the working condition of its exhaust gas temperature of 110° C., the steel consumption of boiler proper is about 6.87 tons of steel and the overall weight is 10.324 tons. However, when the integrated pressure condensing boiler of the present application is a 2.8 MW hot water boiler and achieves the above heat exchange effect, the steel consumption of boiler proper is just about 5.706 tons, and the overall weight is just 6.435 tons.

The above descriptions are only preferred embodiments of the present application and are not intended to limit the present application. Any modifications, equivalent replacements and improvements made within the spirit and principles of the present application shall be included within the protection scope of the present application.

The invention claimed is:
1. An integrated pressure condensing boiler comprising:
a pressure-bearing housing;
a combustion chamber arranged in the pressure-bearing housing;
a heat-exchange furnace arranged in the pressure-bearing housing communicating with the heat-exchange furnace; and
cooling tube groups fixed in the heat-exchange furnace; wherein
the pressure-bearing housing is provided with a flue gas outlet pipe, a heat-exchange medium inlet and a heat-exchange medium outlet, wherein the flue gas outlet pipe is configured to communicate with the heat-exchange furnace;
heat-exchange medium flows upward in the pressure-bearing housing and in the cooling tube groups, and exchanges heat with high-temperature flue gas flowing downward in the heat-exchange furnace, thereby achieving a counterflow heat exchanging;
the heat-exchange furnace comprises a multi-stage heat-exchange chamber that includes heat-exchange chambers with each heat-exchange chamber being cylindrical, two adjacent heat-exchange chambers are configured to communicate with each other through a flue gas turning channel, and each heat-exchange chamber comprises a cooling tube group of the cooling tube groups vertically arranged within;
the heat-exchange chambers are arranged one upon another from top to bottom, such that the high-temperature flue gas diffuses from a center part of a heat-exchange chamber to a periphery of the heat-exchange chamber and gathers from a periphery of an adjacent heat-exchange chamber of the heat-exchange chamber to a center part of the adjacent heat-exchange chamber, the adjacent heat-exchange chamber being under the heat-exchange chamber, and in each heat-exchange chamber, the high-temperature flue gas laterally scouring the cooling tube group arranged in each heat-exchange chamber;
the heat-exchange medium is driven upward to enter each cooling tube group in a heat-exchange chamber and exchange heat with the high-temperature flue gas in the heat-exchange chamber, and to discharge from an upper part of each cooling tube group and mix with the heat-exchange medium that in the pressure-bearing housing and outside the heat-exchange chambers;
each heat-exchange chamber comprises a cylindrical peripheral wall, an upper tube plate and a lower tube plate, wherein the upper tube plate and the lower tube plate are hermetically connected with the peripheral wall, thereby enclosing an inner cavity of each heat-exchange chamber;
the upper tube plate is provided with a flue gas inlet, and the lower tube plate is provided with a flue gas outlet;
the flue gas outlet of a bottom-most heat-exchange chamber of the multi-stage heat-exchange chamber is arranged at the peripheral wall of the bottom-most heat-exchange chamber, and is configured to communicate with the flue gas outlet pipe;
a first heat-exchange chamber of the multi-stage heat-exchange chamber is configured to communicate with the combustion chamber, and a second heat-exchange chamber of the multi-stage heat-exchange chamber is configured to communicate with the first heat-exchange chamber;
the flue gas inlet of the first heat-exchange chamber is a first flue gas inlet arranged in a center part of the upper tube plate of the first heat-exchange chamber, and the flue gas outlet of the first heat-exchange chamber is a first flue gas outlet arranged close to a peripheral wall of the first heat-exchange chamber;
the flue gas inlet of the second heat-exchange chamber is a second flue gas inlet corresponding to the first flue gas outlet, and the flue gas outlet of the second heat-exchange chamber is a second flue gas outlet arranged in a center part of the lower tube plate of the second heat-exchange chamber;
the second flue gas outlet is used to communicate with a third heat-exchange chamber or communicate with the flue gas outlet pipe provided on the pressure-bearing housing; and
the high-temperature flue gas enters the first heat-exchange chamber from a center part of the first heat-exchange chamber and diffuses to a periphery of the first heat-exchange chamber, the high-temperature flue gas enters the second heat-exchange chamber from a periphery of the second heat-exchange chamber and gathers to the second flue gas outlet arranged at the center part of the lower tube plate of the second heat-exchange chamber, thereby laterally scouring the cooling tube group in the second heat-exchange chamber.

2. The integrated pressure condensing boiler according to claim 1, wherein
when the flue gas inlet or the flue gas outlet is used for passage of center high-temperature flue gas, the flue gas inlet or the flue gas outlet is arranged in a center part of the upper tube plate or the lower tube plate, and is circular; and
when the flue gas inlet or the flue gas outlet is used for passage of peripheral high-temperature flue gas, the flue gas inlet or the flue gas outlet is arranged at a periphery of the upper tube plate or the lower tube plate, and is arc shaped, or the flue gas inlet or the flue gas outlet comprises a plurality of circular holes that are arranged in an arc shape.

3. The integrated pressure condensing boiler according to claim 2, wherein the flue gas inlet or the flue gas outlet arranged at the periphery of the upper tube plate or the lower tube plate is coaxial with a heat-exchange chamber that the upper tube plate or the lower tube plate belongs to.

4. The integrated pressure condensing boiler according to claim 2, wherein the flue gas inlet or the flue gas outlet arranged in the center part of the upper tube plate or the lower tube plate, is arranged coaxially with a heat-exchange chamber that the upper tube plate or the lower tube plate belongs to.

5. The integrated pressure condensing boiler according to claim 1, wherein
a shape, position and size of the flue gas outlet of the heat-exchange chamber corresponds to a shape, position and size of the flue gas inlet of the adjacent heat-exchange chamber, respectively; and
the flue gas turning channel is arranged vertically between the two adjacent heat-exchange chambers.

6. The integrated pressure condensing boiler according to claim 1, wherein all cooling tubes of the cooling tube group in each heat-exchange chamber are connected vertically between the upper tube plate and the lower tube plate of each heat-exchange chamber, and are configured to communicate with a space that is inside of the pressure-bearing housing and outside of the heat-exchange chambers.

7. The integrated pressure condensing boiler according to claim 6, wherein the cooling tube group in each heat-exchange chamber comprises 2 to 4 cooling tube circles;

each cooling tube circle comprises multiple cooling tubes that are arranged circularly; and each cooling tube circle is arranged around the flue gas inlet or the flue gas outlet of a corresponding heat-exchange chamber and the flue gas inlet or the flue gas outlet is arranged at a center part of the corresponding heat-exchange chamber.

8. The integrated pressure condensing boiler according to claim 1, wherein the first flue gas inlet is circular, and the first flue gas outlet and the second flue gas inlet are arc shaped.

9. The integrated pressure condensing boiler according to claim 1, wherein the first flue gas inlet is circular, and both the first flue gas outlet and the second flue gas inlet comprise a plurality of circular holes that are arranged in an arc shape.

10. The integrated pressure condensing boiler according to claim 1, wherein a height of the second heat-exchange chamber is less than a height of the first heat-exchange chamber.

11. The integrated pressure condensing boiler according to claim 1, wherein the multi-stage heat-exchange chamber is a 4-stage heat-exchange chamber comprising four heat-exchange chambers;

the second heat-exchange chamber is connected with a third heat-exchange chamber of the multi-stage heat-exchange chamber, and the third heat-exchange chamber is connected with a fourth heat-exchange chamber of the multi-stage heat-exchange chamber;

the flue gas inlet of the third heat-exchange chamber is a third flue gas inlet that is arranged in a center part of the upper tube plate of the third heat-exchange chamber and that matches the second flue gas outlet, and the flue gas outlet of the third heat-exchange chamber is a third flue gas outlet arranged close to a peripheral wall of the third heat-exchange chamber; and the flue gas inlet of the fourth heat-exchange chamber is a fourth flue gas inlet corresponding to the third flue gas outlet, the flue gas outlet of the fourth heat-exchange chamber is a fourth flue gas outlet arranged at the peripheral wall of the fourth heat-exchange chamber and communicating with the flue gas outlet pipe.

12. The integrated pressure condensing boiler according to claim 11, wherein the first flue gas inlet, the second flue gas outlet and the third flue gas inlet are circular; and each of the first flue gas outlet, the second flue gas inlet, the third flue gas outlet and the fourth flue gas inlet is arc shaped, or comprises a plurality of circular holes that are arranged in an arc shape.

13. The integrated pressure condensing boiler according to claim 11, wherein the flue gas outlet pipe is arranged away from the fourth flue gas inlet.

14. The integrated pressure condensing boiler according to claim 11, wherein heights of the first heat-exchange chamber, the second heat-exchange chamber, the third heat-exchange chamber and the fourth heat-exchange chamber decrease sequentially.

15. The integrated pressure condensing boiler according to claim 1, wherein heights of the heat-exchange chambers of the multi-stage heat-exchange chamber decrease sequentially in a downward direction.

16. The integrated pressure condensing boiler according to claim 1, further comprising partition plates arranged between the pressure-bearing housing and the heat-exchange furnace, and surrounding the heat-exchange furnace.

17. The integrated pressure condensing boiler according to claim 16, wherein each heat-exchange chamber is correspondingly provided with a partition plate.

18. The integrated pressure condensing boiler according to claim 16, wherein a partition plate completely or incompletely closes a gap between the pressure-bearing housing and the heat-exchange furnace.

* * * * *